3,556,905
APPARATUS FOR THE MANUFACTURE OF PIPES AND TUBULAR BODIES FROM ROVING STRANDS SOAKED WITH SYNTHETIC RESIN
Ludwig Wesch, Heidelberg, Germany, and Marcel Pfister, Eckbolsheim, and Herbert Löeffler, Rixheim, France, assignors to Mancar-Trust, Vaduc-Liechtenstein, a firm
Filed Sept. 11, 1968, Ser. No. 759,067
Claims priority, application Germany, Sept. 12, 1967,
M 75,521
Int. Cl. B31c *3/00, 11/04, 19/00*
U.S. Cl. 156—429                               7 Claims

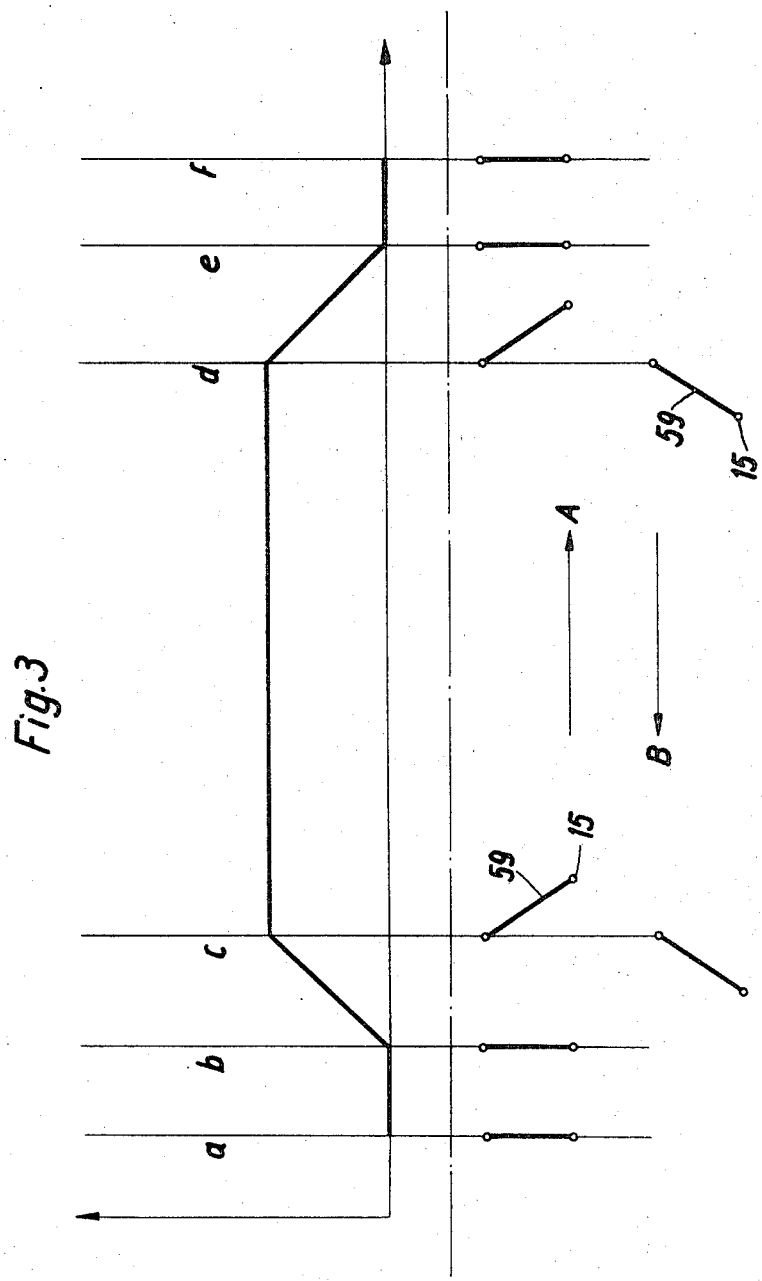

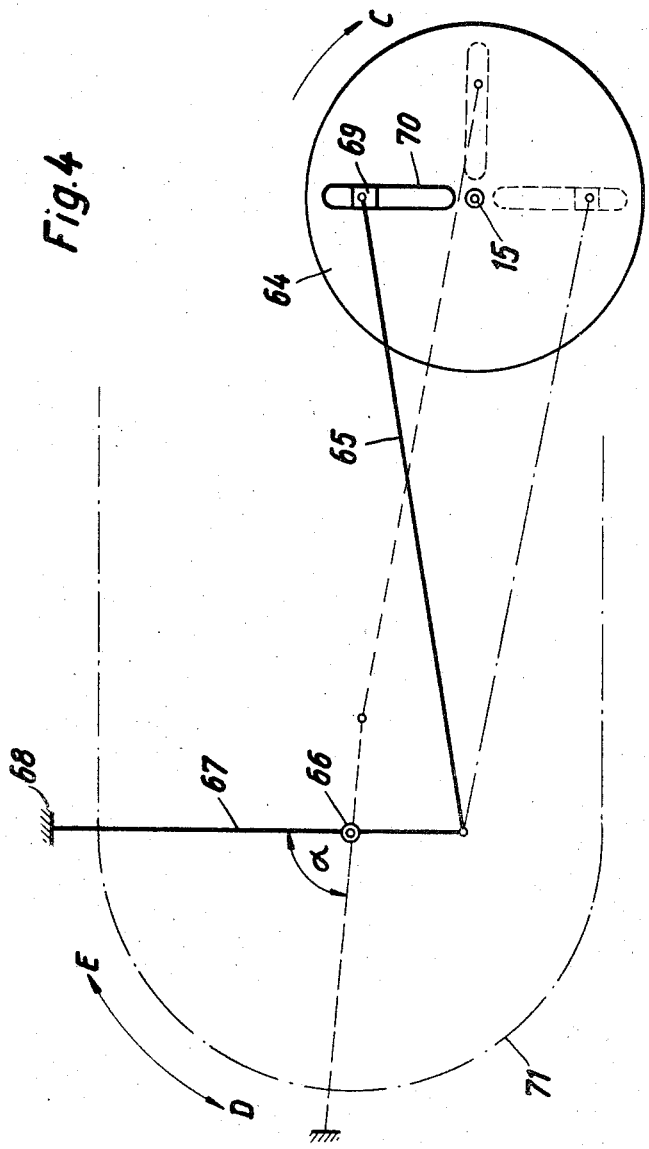

ABSTRACT OF THE DISCLOSURE

An apparatus for manufacturing pipes or tubular bodies from roving strands soaked with synthetic resin which comprises a winding cylinder drum rotatably mounted in the apparatus on which roving strands impregnated with liquid synthetic resin are wound. The roving strands are supported on a carriage which is reciprocally driven by a screw spindle along a path parallel to the longitudinal axis of the winding cylinder drum. The carriage has an impregnating bath and thread guiding means, both of which are pivotally movably mounted on the carriage and move in accordance with the feeding direction of the roving strands from the carriage to the winding cylinder drum. The improvement comprises means for coordinating the translational movement of the carriage and the angular position of the pivotally mounted impregnating bath and thread guiding means with the rotational movement of the winding cylinder drum.

BACKGROUND OF THE INVENTION

The invention relates to an improved apparatus for manufacturing pipes or tubular bodies from roving strands soaked with synthetic resin. A carriage carries a plurality of spools of roving strands. This carriage is operatively connected to a screw spindle which drives the carriage to and fro. The impregnating bath and strand guiding means are pivotally mounted on the carriage. A winding cylinder drum is rotatably mounted opposite to and parallel to the screw spindle. The rotational movement of the winding cylinder drum and the translational movement of the carriage supporting the roving srtand spools are synchronized with respect to each other. The afore-described arrangement is already known in the art and is disclosed, for example, in German Pat. (German Democratic Republic) No. 57,072.

In such known devices the carriage for supporting the roving strand spools and the impregnating bath move reciprocally and parallel to the axis of the rotating winding cylinder drum. When the spool supporting carriage is mounted close to the winding cylinder drum and when the roving strands are fed to the drum at a certain angle, a tubular body is formed on the winding cylinder which is formed of cross-wise wound roving strands. Such a tubular body has, after having undergone a hardening process, a surprisingly strong bursting strength. The better the synchronization of the translational movement of the spool supporting carriage with the rotational movement of the winding cylinder drum during the manufacturing process, the higher will be the bursting strength of the formed tubular body. Consequently, it is very important in the afore-described manufacturing process to synchronize as perfectly as possible the translational movement of the carriage with the rotational movement of the winding cylinder drum so that the controls for the movements of the winding cylinder drum, the carriage, as well as the swingable movement of the impregnating bath are fully coordinated.

In the afore-described known devices purely mechanical means are employed for controlling afore-described movements. These purely mechanical means have, however, been found to be inadequate because they can not produce the necessary precision in controlling and synchronizing the various movements. The necessity for precise controls becomes evident from the fact that even slight deviations in velocity cause a substantial shifting of the roving strands on the winding cylinder drum. In addition thereto, it should be noted that the rotational movements of the winding cylinder drum must be uniformly decelerated in a precise manner by braking means when the carriage reaches one of the longitudinal ends of the winding cylinder drum and the feeding angle of the roving strands must also be changed in a precise manner when the direction of movement of the carriage is reversed at the longitudinal ends. Imprecise controlling of the afore-described movements cause a lot of waste in the herein described manufacturing process. Thus, for example, if the length of the formed tubular pipe amounts to 10 meters, a total of approximately 1 meter of pipe has to be discarded from both ends of the pipe because the roving strands at those ends are not always laid side by side but partially one over the other.

SUMMARY OF THE INVENTION

It is, accordingly, a primary object of the invention to very precisely and fully automatically coordinate the translational movement of the spool-supporting carriage with pivotal movement of the impregnating bath, the feed direction control means of the roving strands and the rotational movement of the winding cylinder drum.

A rotational speed of the winding cylinder drum of 60 meters per minute has been attained with the improved control means of applicants' invention while at the same time a maximum distance of 1 mm. between strands has been maintained. The improved control means comprises a control circuit which has two pulse-generators and which effects a rotation of the screw spindle and the wind-cylinder drum at constant speed. One of the pulse generators controls the rotational speed of the screw spindle and the other the rotational speed of the winding cylinder drum. The pulse difference is fed via a compensator to a servomotor, which corrects the drive control mechanism of the screw spindle in accordance with the closing of the control circuit. The drive mechanism for the carriage comprises a differential drive which is operatively connected to the drive spindle of the carriage and which has a gear wheel which is driven by means of a servomotor in accordance with the movement of the carriage. The shaft of this servomotor is coupled to the drive mechanism for the carriage and the impregnating bath in such a manner that it can completely stop the movement of the carriage. Furthermore, when breaking and reversing the movement of the carriage the servomotor also is instrumental in changing the feed direction of the roving strands up to their zero-feed position, and when the movement of the carriage has been reversed to gradually change again the feed direction of the roving strands from its zero position to its regular feed position. By means of these improved control means of applicants' invention, there is not only achieved a tight and closely spaced winding of the roving strands, but also the distance along which this uniform tight and close winding is effected on the tubular body is considerably increased, so that at both ends of the tubular body the usual waste product is reduced to a minimum.

In the event a closed tubular container is to be manufactured from roving strands soaked with synthetic resin, the afore-described arrangement of applicants' invention can also be utilized with certain modifications. This modification comprises an accessory which has an adjustable crank drive which is coupled to the impregnating bath via a longitudinally adjustable shaft, the free end of which is connected with one arm of a two-armed lever, whereas the other arm of the two-armed lever supports a threaded guide comb. The lever is movably positioned on a straight member which is parallel to the axis of the winding drum cylinder and a straight line extension of this lever is perpendicular to the afore-mentioned axis. By means of this arrangement there may be manufactured closed containers or containers having a central opening in one of the end surfaces.

BRIEF DESCRIPTION OF DRAWINGS

The invention is illustrated by way of example in the accompanying drawings which form part of this application and in which:

FIG. 3 is a diagram illustrating the velocity of the spool supporting carriage in relation to the elapsed time; and FIG. 4 is a plan schematic view of the control means for winding closed containers.

DESCRIPTION OF PREFERRED EMBODIMENTS

Figure 1:
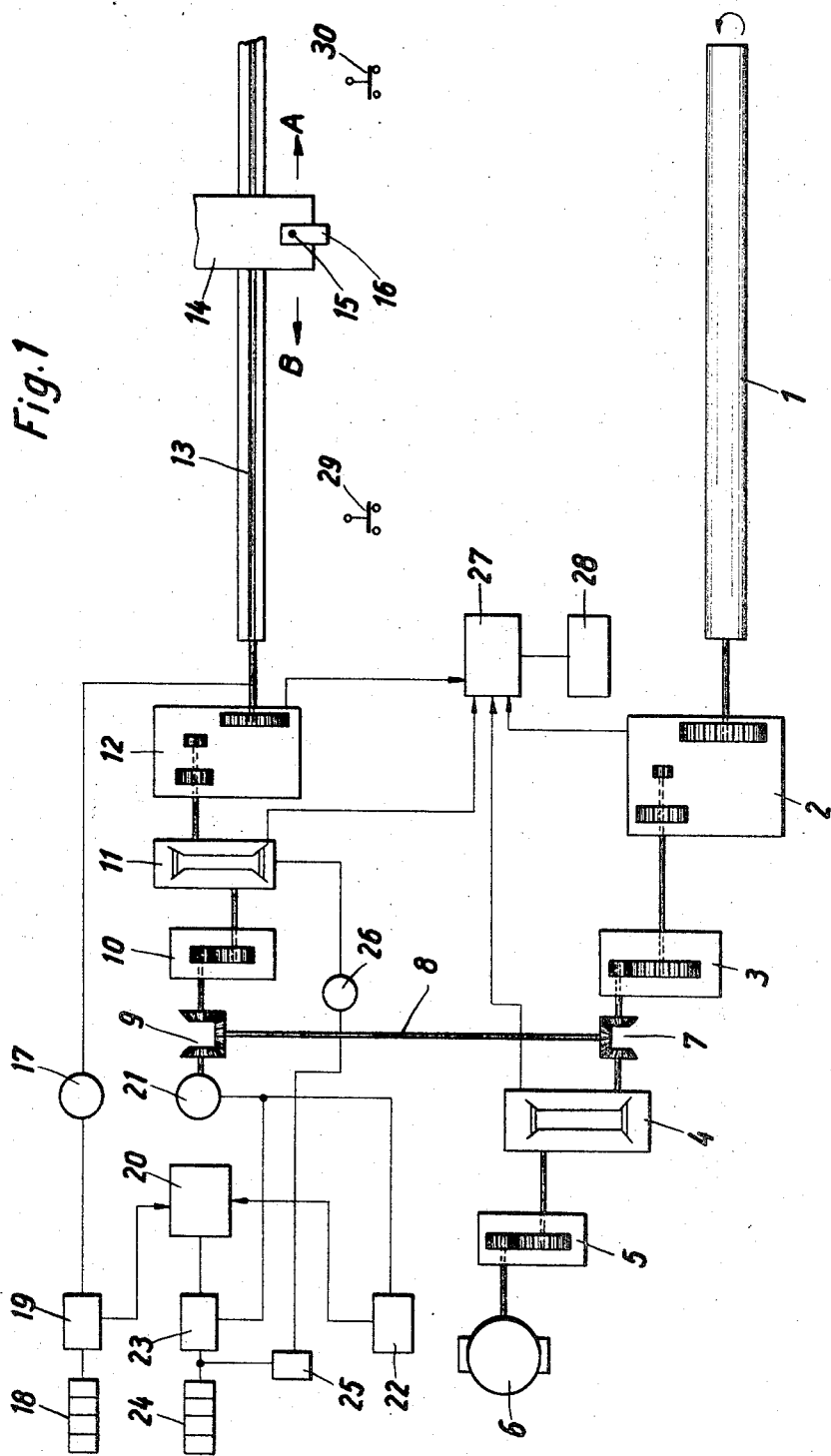
FIG. 1 is a schematic view of the drive and control mechanism forming part of this invention.
Figure 2:
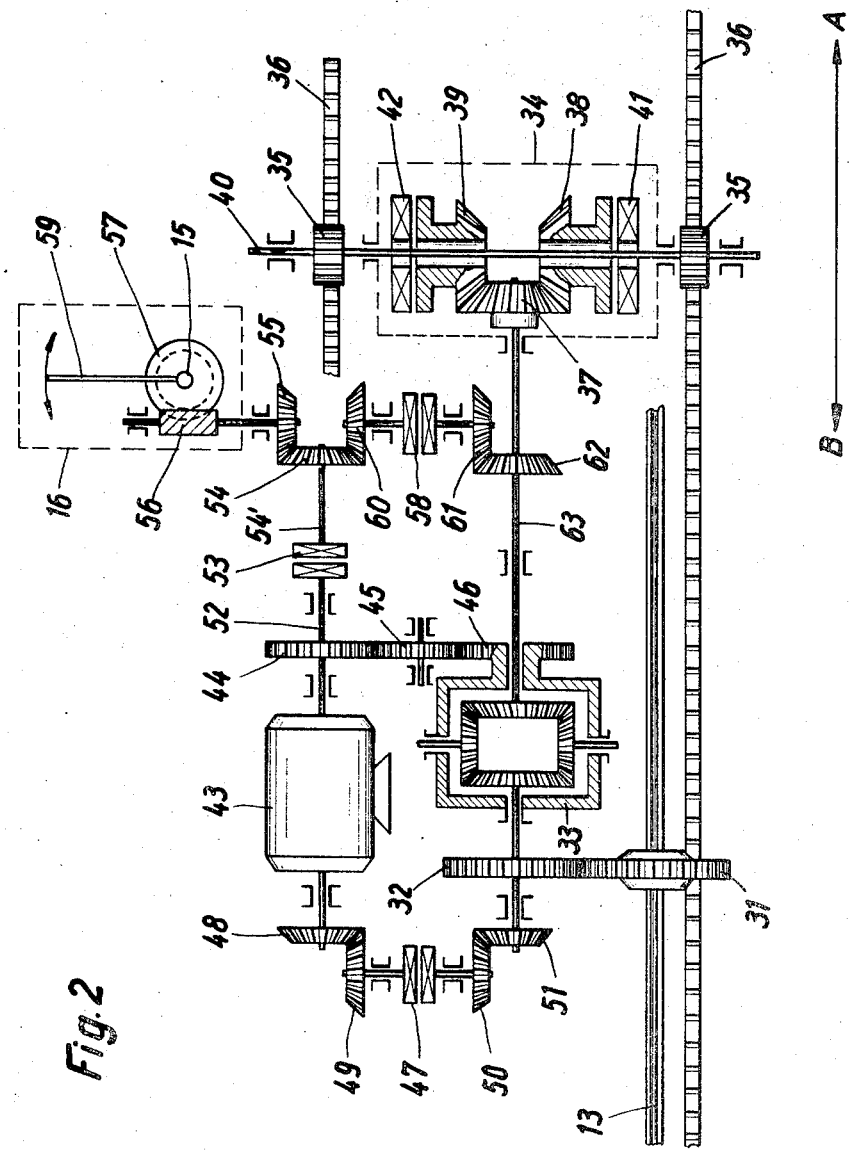
FIG. 2 is a partial view of the arrangement of this invention shown partially in section.

Referring now to the drawings, there is illustrated in FIGS. 1–4 a winding cylinder drum 1 which is driven by means of a principal drive motor 6 via a switchable stepped drive mechanism 2 (reduction ratio 1:1 to 5:1). A reduction gear 3 (reduction ratio 20:1), a PIV-drive mechanism 4 and a further reduction gear 5 (reduction ratio 2:1). A bevel gear arrangement 7 is disposed between the reduction gear 3 and the PIV-drive mechanism 4 which is connected by means of a shaft 8 to a second bevel gear arrangement 9. The latter is connected to and drives a screw spindle 13 which supports a spool supporting carriage 14, via a reduction gear 10 (reduction ratio 2:1), a PIV-drive mechanism 11 and a switchable stepped drive mechanism 12 (reduction ratio 1:1 to 1:5). By corresponding adjustments of the PIV-drive mechanisms 4 and 11, as well as the stepped drive mechanisms 2 and 12, the rotational speed of the screw spindle 13 can be adjusted in such a way that a predetermined translational movement of the spool supporting carriage 14 occurs per rotation of the winding cylinder drum 1. An impregnating bath 16 is pivotally mounted about a vertical axis 15 on the carriage 14.

In order to attain the very precise synchronization of the various movements there is operatively connected a pulse generator 17 to the drive mechanism of the screw spindle 13, which emits a certain number of pulses per rotation of the screw spindle 13. Consequently, the distance traversed by the carriage 14 can be determined by the number of pulses emited by the pulse generator 17. The distances covered by the carriage 14 can thus be optically indicated by a mechanical counter 18 which is operatively connected to a pulse counter 19. The number of pulses generated by the rotation of the screw spindle 13 is conveniently compared in this counter 19 with the comparison pulses emitted by the pulse generator 17. The counter 19 emits a comparison pulse which is conducted to a comparator 20.

A second pulse generator 21 is also operatively connected to the drive mechanism for the winding cylinder drum 1 as illustrated in FIG. 1. This pulse generator 21 also emits per rotation of the winding cylinder drum 1 a certain number of pulses which are conducted via a ring counter 22 to the comparator 20. The current pulses emanating from the pulse counter 19 are now compared in the comparator 20 with the ring pulses of the ring counter 22. Signals are thus formed in the comparator 20 which indicate first a pulse difference which is then converted in the counter 23 into a pulse difference sum and is eventually optically indicated in the electrical indicator 24.

This pulse difference sum, which represents a certain differential voltage, is conducted to the servomotor 26 via a compensator 25. The servomotor 26 adjusts the PIV-drive mechanism 11, thereby correcting the drive for the screw spindle 13, and the control circuit is thereby completely closed.

A safety device 27, which forms an electrical barrier, and which is connected to the strand feed angle control means 28, is operatively connected to the driving elements 2, 4, 11 and 12. This safety device 27 disconnects the various drives of the machine when the maximum allowable thread or carriage velocities are exceeded, as well as when the strand feed angle control means are misadjusted. The end switches 29 and 30, which are adjustable for any desired spool length, control the reverse switching for the spool supporting carriage as follows:

The screw spindle 13 (see FIG. 2) drives by means of a predetermined number of rotations $n$ a differential drive 33 via a pair of gear wheels 31, 32 and via a switchover gear arrangement 34 the gear wheels 35, which engage fixed gear racks 36. In this manner, the spool supporting carriage 14 is moved parallel to the winding cylinder drum 1 since it is supported on the wheels 35 (not shown). The switch-over gear arrangement 34 consists of a driving bevel gear 37 and a driven bevel gear pair 38, 39. A positive drive between the gear wheels 35 and the drive shaft 40 is established by means of the couplings 41 and 42 in accordance and in dependency with the direction of movement of the spool supporting carriage 14. Thus, if the carriage 14, for example, moves in the direction of arrow A, the coupling 41 is closed and the coupling 42 is open. Therefore, the gear wheels 35 turn the screw spindle 13 at a velocity corresponding to revolutions $n$, and the carriage 14 consequently, moves to a preselected point, for example, point $d$ in FIG. 3 at a constant velocity. The distance between points $d$ and $e$ constitutes the lapsed time during which the deceleration adjustment is affected. At the end of this adjusting time, the carriage 14 comes to a complete stop. When the carriage has reached point $d$, a servomotor 43 is switched on by means of the end switch 30 (see FIG. 1). This motor can be regulated according to a predetermined function from an angular velocity $n_1$ to a zero angular velocity and then to the spindle angular velocity $n$ proper. The motor 43 drives by means of gear wheels 44 and 45 the gear drive wheel 46 of the differential drive 33, so that at the gear rack drives 35, 36 there is applied the velocity differential between the spindle 13 and the motor 43. As soon as the servomotor 43 reaches the angular velocity $n$ of the spindle 13, the coupling 47 is automatically closed and thus guaranties the positive drive between the spindle 13 and the servomotor 43 via the bevel gear wheel pair 48, 49 and 50, 51. This causes the gear wheels 35 to reach zero velocity and, consequently, the spool support carriage 14 to reach a standstill at point $e$.

A motor shaft 52 extends from the other side of the servomotor 43. The shaft 52 is connected to a bevel gear 54 via a coupling 53 and a shaft 54'. The bevel gear 54 engages a bevel gear 55 and thereby drives the worm gear 56, which in turn engages a worm wheel 57. A pin 15 is fixedly co-axially connected to the worm gear 57 which, when rotated pivots the impregnating bath 16 according to the same function with which the servomotor 43 is regulated. In such a case the coupling 53 is closed.

The movement of the impregnation bath 16 takes place in such a way that, when the carriage velocity decreases, the pivotal movement of the impregnating bath increases. In this way, the feed angle for the strands remains constant, despite the deceleration of the carriage 14. When the carriage 14 has reached a standstill, the impregnating bath 16 and its feed angle extend prependicularly to the axis of the winding cylinder drum 1. At this instant, the coupling 53 is open so that the impregnating bath 16 also comes to a standstill.

While the carriage 14 and the impregnating bath 16 remain at a standstill, the winding cylinder drum 1 continues to rotate and thus there results, for example, a one time radial looping of the winding cylinder drum 1. During the time period e–f a pulse is emitted, which activates the switchover gear arrangement 34, by disengaging the coupling 41 and closing the coupling 42. In this way, the carriage 14 is switched over from a forward drive to a backward drive.

Simultaneously therewith, by closing a coupling 58, the swing arm 59 of the impregnating bath 16 is coupled, by means of the shaft 63 and the bevel gears 60, 61 and 62, to the differential drive 33 and the switchover gear arrangement 34, whereby the impregnating bath 16 during the return run of the carriage 14 is turned in the opposite new direction. After the switching-over has been effected, the coupling 47 is opened and the servomotor 43 is regulated downwardly in an identical function from its full velocity $n_1=n$ to zero. In this manner, the spool support carriage 14 starts to move in the opposite direction (arrow B) and the impregnating bath 16 now swings so that during the acceleration period e–d the feed angle is now maintained in the opposite direction (see the position of the swing arm 59 in FIG. 3). After the point d has been reached, the regulation process for the return movement is terminated. The coupling 58 is now disengaged and the impregnating bath 16 has now reached the prescribed feed angle and therefore stands still. The servomotor 43 has now also reached a standstill and the spool support carriage 14 now runs along the screw spindle 13 at a constant velocity in a direction parallel to the axis of the winding cylinder drum 1 (arrow B) until the carriage 14 has reached the end switch 29, which corresponds to point c (FIG. 3). Now the rotational direction of the servomotor 43 is again reversed and the afore-described adjusting and control process is repeated in an analogous manner during the time period c–d–a–b–c. It is to be understood that all of the couplings mentioned heretofore are electrically controlled by means well known in the art. Furthermore, in lieu of the bevel gears illustrated in FIGS. 1 and 2, spur gears may be used and vice versa, as well as any other known forms of positive drive means, as for example, drive chains and chain wheels. The selection of positive drive means thus depends only on the conditions imposed by the types of constructions utilized.

While for the production of pipes there is necessary a large number of side by side running roving strands, for example, up to 80 in number, which must be wound around the winding drum cylinder, the production of tubular bodies such as closed containers, require a considerably smaller number of roving strands, for example 12, and even less. In such a case, the roving strands can no longer be guided through the impregnating bath 16 and its guiding comb (not shown). Therefore, the guiding of the strands is effected in such a case by means of a pin 15 of the impregnating bath 16 which can be coupled to a lever 67 having a guide comb 68 mounted at its free end which is connected by means of an adjustable crank drive 64, having an arm 65 which is connected to the lever 67. A pivot pin 69 is adjustably mounted in the slot 70, whereby simultaneously the length of the arm 65, which is formed of two parts, can be adjusted by, for example, a not illustrated adjustable threaded sleeve. This accessory installation is illustrated in FIG. 4 in a position in which the spool support carriage 14 has reached during its return run the position c according to FIG. 3, at which position the deceleration of the carriage 14 begins. In the identical manner as described heretofore in relation to the pivotal movement of the impregnating bath, the adjustable crank drive 64 is rotated in the direction of the arrow C due to its connection to the pin 15 of the impregnating bath. This causes a pivoting of the guide comb 68 in the direction of the arrow D. When the spool support carriage 14 has come to a stop in the position b of the diagram of FIG. 3, the crack drive 64 and with it the guide comb 68 has reached a position illustrated in dashed lines in FIG. 4 which is removed by the angle α from the position illustrated in solid lines in FIG. 4, and the crank drive 64 now has also come to a stop. When the spool support carriage 14 moves in its return movement in the reverse direction, the crank drive 64 continues to rotate in the direction of the arrow C and thereby causes the guide comb 68 back to its feed position (movement in the direction of the arrow E). Jointly therewith, the swing arm 59, as described above, as well as the lever 67 with the guide comb 68, are pivoted in the direction of the feed angle for the reverse run (forward travel) of the spool support carriage 14.

At the end of the acceleration period (position C) the arm 65 assumes the position illustrated in a dashed-dotted line in FIG. 4 and the crank drive 64 is deactivated and brought to a standstill in the same manner as described in relation to the impregnating bath 16; thereafter the winding of roving strands onto the cylindrical portion of the winding cylinder drum 1 is resumed anew. The accessory installation which is connectable to the driving system of the impregnating bath 16, can effect a special adjustment around the bottom 71 of the container to be produced by winding (see FIG. 4). When the bottom 71 is thus produced, the roving strands are moved through an other impregnating bath which is not illustrated.

Although our invention has been illustrated and described with refeernce to the preferred embodiment thereof, we wish to have it understood that it is in no way limited to the details of such embodiment, but is capable of numerous modifications within the scope of the appended claims.

What we claim is:

1. In an apparatus for the manufacture of tubular shaped bodies from roving strands soaked with synthetic resin, wherein a winding cylinder drum is rotatably mounted and a roving strand spool supporting carriage is operatively connected to a screw spindle so as to be reciprocally movable in a direction parallel to the longitudinal axis of said winding cylinder drum, improved control means for synchronizing the rotational movement of said drum with the translational reciprocal movement of said carriage, comprising in combination, an impregnating bath and roving strand feed direction control means pivotally mounted on said carriage, first adjustable gear drive means operatively connected to said screw spindle, control circuit means operatively connected to said supporting carriage, on the one hand, and said winding cylinder drum on the other hand, so as to synhcronize their respective movements in a predetermined manner, said control circuit means comprising two pulse generators, a first one of said two pulse generators being operatively connected to said screw spindle and a second one of said two pulse generators being operatively connected to said winding cylinder drum, a comparator being operatively connected to said first and second pulse generators for receiving pulses therefrom and in turn conducting pulses to a first servomotor via a compensator in accordance with the pattern of pulses received from said two pulse generators, said first servomotor being operatively connected to said first adjustable gear drive means and being adapted to adjust the rotational movement of said screw spindle in accordance with the pulse pattern received by said comparator, and a source of electrical power operatively connected to said control circuit for energizing the electrically powered components thereof.

2. In an apparatus for the manufacture of tubular shaped bodies from roving strands soaked with synthetic resin as set forth in claim 1, wherein said winding cylinder drum is connected to second adjustable gear drive means, electrical pulse generating safety means operatively connected to said first and second adjustable gear drive means and to said impregnating bath and roving strand feed direction control means, which automatically disconnect the aforementioned means when their movements exceed certain predetermined velocities.

3. In an apparatus for the manufacture of tubular shaped bodies from roving strands soaked with synthetic resin, as set forth in claim 1, wherein said control circuit means further comprise differential gear drive means positively mechanically connected to said screw spindle, at one side thereof, and to a second servomotor, at the other side thereof;

the operation of said second servomotor being adjusted in accordance with the translational movement of said carriage;
a first shaft axially extending from said second motor;
first coupling means selectively operatively connecting said shaft to said impregnating bath and roving strand feed direction control means; and
second coupling means selectively operatively connectively connecting said shaft to said screw spindle.

4. In an apparatus for the manufacture of tubular shaped bodies from roving strands soaked with synthetic resin, as set forth in claim 3, including third coupling means selectively operatively connecting said second shaft and said first coupling means.

5. In an apparatus for the manufacture of tubular shaped bodies from roving strands soaked with synthetic resin, as set forth in claim 4, including indicating means operatively connected to said comparator for indicating the relative velocities of the movements of said winding cylinder drum and said carriage.

6. In an apparatus for the manufacture of tubular shaped bodies from roving strands soaked with synthetic resin, as set forth in claim 5, wherein said impregnating bath and roving strand feed direction control means are pivotally mounted about a third shaft extending therefrom, adjustable crank drive means axially mounted on said third shaft, a two-armed lever pivotally mounted on said carriage, roving strand feed guiding means mounted on the free end of one arm of said two-armed lever, and a fourth shaft pivotally connected at one end to said crank drive means and at the other end to the other arm of said two-armed lever.

7. In an apparatus for the manufacture of tubular shaped bodies from roving strands soaked with synthetic resin, as set forth in claim 6, wherein said two-armed lever pivots in a plane which is parallel to the longitudinal axis of said drum about an axis which is normal to said longitudinal axis of said drum.

References Cited

UNITED STATES PATENTS

| | | | |
|---|---|---|---|
| 2,812,007 | 11/1957 | Touchett et al. | 156—429X |
| 3,401,073 | 9/1968 | Wood | 156—429X |
| 3,443,765 | 5/1969 | Jube et al. | 156—429X |
| 3,492,187 | 1/1970 | Hirtzer | 156—431X |

BENJAMIN A. BORCHELT, Primary Examiner

T. H. WEBB, Assistant Examiner

U.S. Cl. X.R.

156—173